United States Patent
Logar et al.

(10) Patent No.: US 6,305,398 B1
(45) Date of Patent: Oct. 23, 2001

(54) VALVE CONFIGURATION AND METHOD FOR HEATING A VALVE CONFIGURATION

(75) Inventors: Andreas Logar, Hattingen; Rainer Neumann, Mülheim an der Ruhr; Edwin Gobrecht, Ratingen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/436,599

(22) Filed: Nov. 9, 1999

Related U.S. Application Data

(63) Continuation of application No. PCT/DE98/01202, filed on Apr. 30, 1998.

(30) Foreign Application Priority Data

May 9, 1997 (DE) .............................................. 197 19 725

(51) Int. Cl.⁷ ...................................................... F17D 1/16
(52) U.S. Cl. ............................ 137/13; 137/340; 137/339; 60/680
(58) Field of Search .................................. 137/339, 340, 137/13; 60/680

(56) References Cited

U.S. PATENT DOCUMENTS

| | | | |
|---|---|---|---|
| 545,612 | * 9/1895 | Renshaw | 137/340 |
| 1,528,822 | * 3/1925 | Gilchrist | 137/340 |
| 2,657,541 | * 11/1953 | Schilling | 137/339 |
| 3,200,833 | * 8/1965 | Phillips | 137/154 |
| 3,365,885 | * 1/1968 | Firth et al. | 137/340 |
| 3,380,466 | * 4/1968 | Sarra | 137/340 |
| 3,720,227 | * 3/1973 | Curran | 137/339 |
| 4,594,904 | * 6/1986 | Richter | 73/863.86 |

* cited by examiner

Primary Examiner—A. Michael Chambers
Assistant Examiner—Thomas L. McShane
(74) Attorney, Agent, or Firm—Herbert L. Lerner; Laurence A. Greenberg; Werner H. Stemer

(57) ABSTRACT

A method for heating a valve configuration of a steam turbine, includes the steps of directing steam to a closed valve of the valve configuration, condensing the steam in the valve, and discharging the condensate. The temperature is kept at the saturated-steam temperature corresponding to the respective steam pressure. The method is in particular suited for keeping a bypass-valve configuration hot. The bypass-valve configuration is intended for bypassing the steam turbine on the steam side. For this purpose, a steam line is connected to the valve configuration. The steam line has an inclined line section with a rising slope or a falling slope directly upstream of the valve configuration. A valve configuration for a steam turbine is also provided.

8 Claims, 2 Drawing Sheets

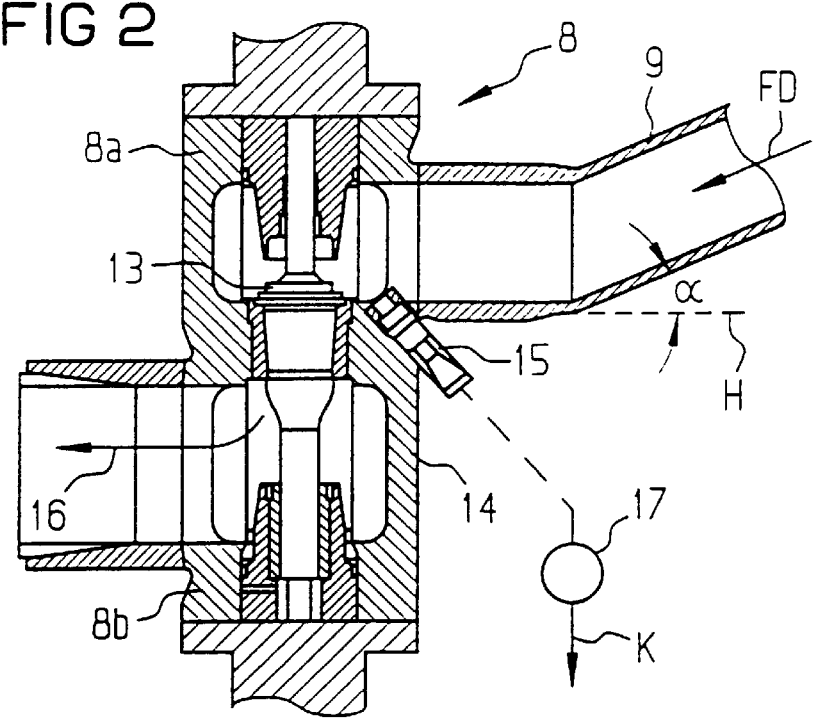
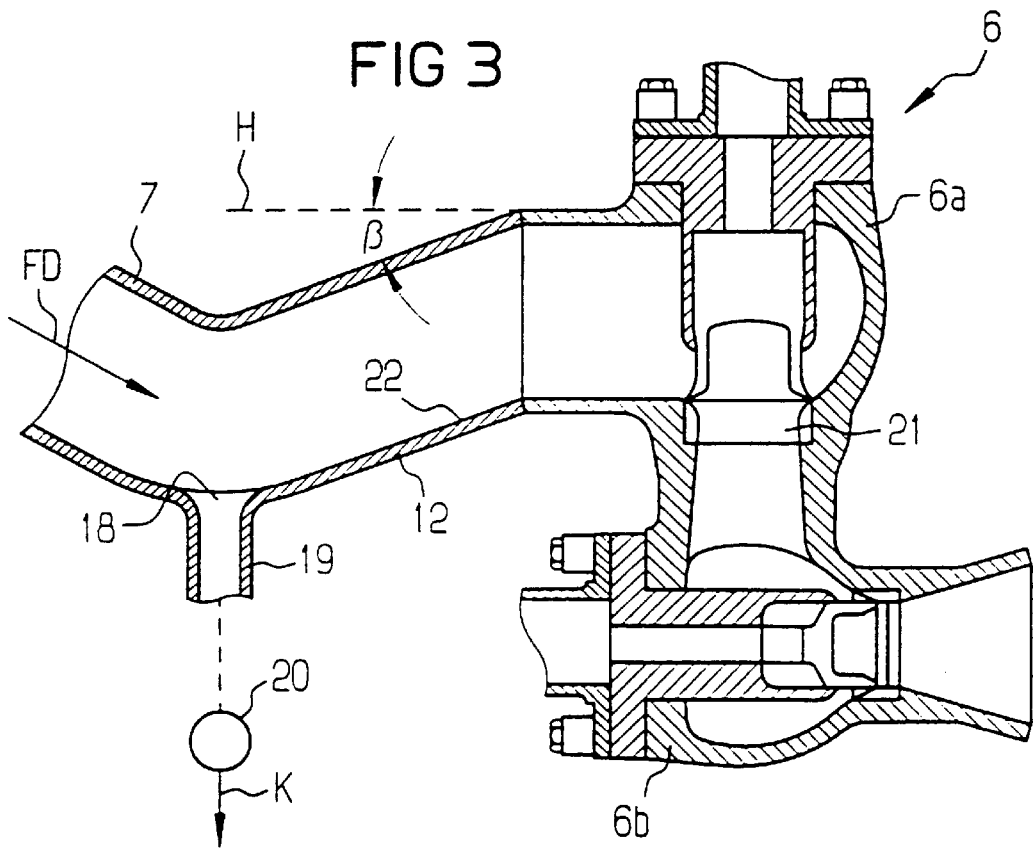

VALVE CONFIGURATION AND METHOD FOR HEATING A VALVE CONFIGURATION

CROSS-REFERENCE TO RELATED APPLICATION

This application is a continuation of copending International Application No. PCT/DE98/01202, filed Apr. 30, 1998, which designated the United States.

BACKGROUND OF THE INVENTION

Field of the Invention

The invention relates to a valve configuration which is to be heated and a method for heating a valve configuration of a steam turbine.

Published German Patent Application No. 14 26 850 discloses a regulating device for a steam-turbine plant having a high-pressure turbine section and an intermediate-pressure turbine section as well as a reheater provided between the turbine sections. Provided upstream of each turbine section is a valve configuration having in each case a quick-acting valve and a regulating valve. A bypass line, which is closed by two shut-off valves, branches off from the reheater to a condenser.

SUMMARY OF THE INVENTION

It is accordingly an object of the invention to provide a method for heating a valve of valve configuration of a steam turbine and a valve configuration for a steam turbine which overcome the disadvantages of the heretofore-known methods and devices of this general type and which are simple and reliable. The method for heating a valve should be suited, in particular, for keeping a bypass-valve configuration hot and for heating up an intermediate-pressure valve configuration. The valve configuration should be a low cost configuration, in particular, in terms of the pipework needed.

With the foregoing and other objects in view there is provided, in accordance with the invention, a method for heating a valve of a valve configuration of a steam turbine. The method includes the steps of directing steam to the valve of the valve configuration, while the valve is in a closed state; condensing the steam in the valve and forming a condensate; and discharging the condensate.

In accordance with another mode of the invention, a bypass-valve configuration is connected to a condenser. Live steam is used as the steam for heating by feeding it via a bypass line to the bypass-valve configuration.

In accordance with a further mode of the invention, an intermediate-pressure valve configuration is connected to a steam turbine. Live steam is fed to the steam turbine and is used for heating the intermediate-pressure valve configuration.

With the objects of the invention in view there is also provided, a valve configuration for a steam turbine, including a valve being in a closed state, and a steam line having a line section opening into the valve, the line section being sloped with respect to a horizontal line and directing steam to the valve for heating the valve by condensing the steam and forming a condensate.

In accordance with another feature of the invention, the line section extends with a falling slope from the valve and has a lowest point. A draining device is connected to the steam line via the lowest point.

In accordance with a further feature of the invention, the line section extends with a rising slope from the valve and has a lowest point. A draining device, which opens when the condensate is formed, is connected to the valve at the lowest point.

The term valve configuration refers in particular to a bypass-valve configuration and/or an intermediate-pressure valve configuration which in each case may include a quick-acting valve with a control valve connected downstream.

The invention is based on the relization that providing a heating-up line involves a considerable amount of material and is therefore very cost-intensive, in particular in the case of a bypass-valve configuration for low-pressure or intermediate-pressure steam of a steam turbine having a bypass to the condenser of the steam turbine. In this case, the bypass can branch off from a live-steam line, which is run to the steam turbine, between a steam strainer and a live-steam or intermediate-pressure valve configuration. The bypass-valve configuration is heated up on the quick shut-off side via the heating-up line when the quick-acting valve is closed. To this end, the heating-up line would have to be run to the bypass-valve configuration in such a way that, due to a pressure gradient generated along the steam strainer, a steam flow has a steam circulation closed via the quick-acting valve and via the bypass. In a configuration having a steam strainer provided in the quick-acting valve of the intermediate-pressure valve configuration, a pressure gradient necessary for the circulation of the heating-up steam would be very small, so that, due to the small pressure gradient, lines having a large diameter are therefore necessary for achieving the required mass flow for heating the bypass-valve configuration. This in turn leads to high costs in terms of the material needed. This disadvantage can be avoided with a heating by condensation according to the invention, since no separate lines are necessary.

In a preferred embodiment of the invention, the heating temperature is expediently kept constant at the saturated-steam temperature by continuously discharging the condensate. In order to keep the bypass-valve configuration, which is run to the condenser of the steam turbine, hot, it is advantageous to use the partial flow of the live steam fed to the steam turbine that is already fed to this valve configuration via the bypass on the quick shut-off side.

In principle, a condenser effect is utilized in order to heat up the bypass-valve configuration and to keep it hot, in contrast to utilizing a steam circulation produced by a pressure difference. This condenser effect occurs due to the presence of merely the bypass itself at a blind hole forming upstream of the closed quick-acting valve of the bypass-valve configuration. A flow develops due to the steam column which moves up in the bypass and the steam condenses upstream of the closed quick-acting valve as a result of a temperature gradient along the valve configuration. At a given pressure, the corresponding saturated-steam temperature is kept by a continuous discharge of the condensate on the inflow side of the valve configuration.

This effect is also advantageously utilized during the start-up of the steam turbine by heating up the intermediate-pressure valve configuration connected upstream of the steam turbine through the use of live steam fed to the steam turbine. Here, too, the condensate is discharged, which is produced due to the temperature difference along the valve configuration by cooling off the steam flowing in at live-steam temperature towards the closed quick-acting valve of the valve configuration. Here again, the saturated-steam temperature, corresponding to the respectively prevailing live-steam pressure, is automatically present as long as the generated condensate is discharged continuously.

With regard to the apparatus according to the invention, an essential feature is an angled or oblique configuration of the steam line run to the valve configuration. In this case, the steam line run to the valve configuration expediently has a line section which is provided with a falling or rising slope and then forms the inflow section of the valve configuration.

In the case of a line section provided with a falling slope, a draining opening for discharging the condensate, which is produced, is provided at the lowest point of this section. In an analog manner, in the case of a line section provided with a rising slope, a corresponding draining leadthrough is provided in the valve configuration preferably upstream of the inflow-side valve seat or valve disc of the quick-acting valve. A draining device attached to the draining opening or to the draining leadthrough may be a valve which opens automatically when condensate collects or may be a so-called condensomat, which may be embodied as a radial-stage throttle drain valve.

The advantages achieved by the invention are based in particular on the fact that, by utilizing the condenser effect or condensation effect directly at a closed valve configuration, an additional heating-up line and an additional line extension for producing a pressure difference for a natural steam circulation are dispensed with. On the contrary, the existing steam lines, namely the existing bypass on the one hand and the live-steam line on the other hand, can be used. Only one line section of the steam line run to the respective valve configuration is to be provided with a rising or a falling slope, wherein the line section is to be provided directly upstream of the respective valve configuration.

An essential advantage, in particular for keeping the bypass-valve configuration hot, is the saturated-steam temperature at the valve disc or valve seat which is low compared with the live-steam temperature, and the resulting small temperature gradient along the entire valve configuration. Thus a substantially reduced thermal loading with a corresponding wear reduction and preservation of material is achieved. This in turn increases the service life of the valve configuration.

Other features which are considered as characteristic for the invention are set forth in the appended claims.

Although the invention is illustrated and described herein as embodied in valve configuration and a method for heating a valve configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a longitudinal sectional view of a valve configuration with a line section having a rising slope; and FIG. 3 is a longitudinal sectional view of a valve configuration with a line section having a falling slope.

DESCRIPTION OF THE PREFERRED EMBODIMENTS

Figure 1:
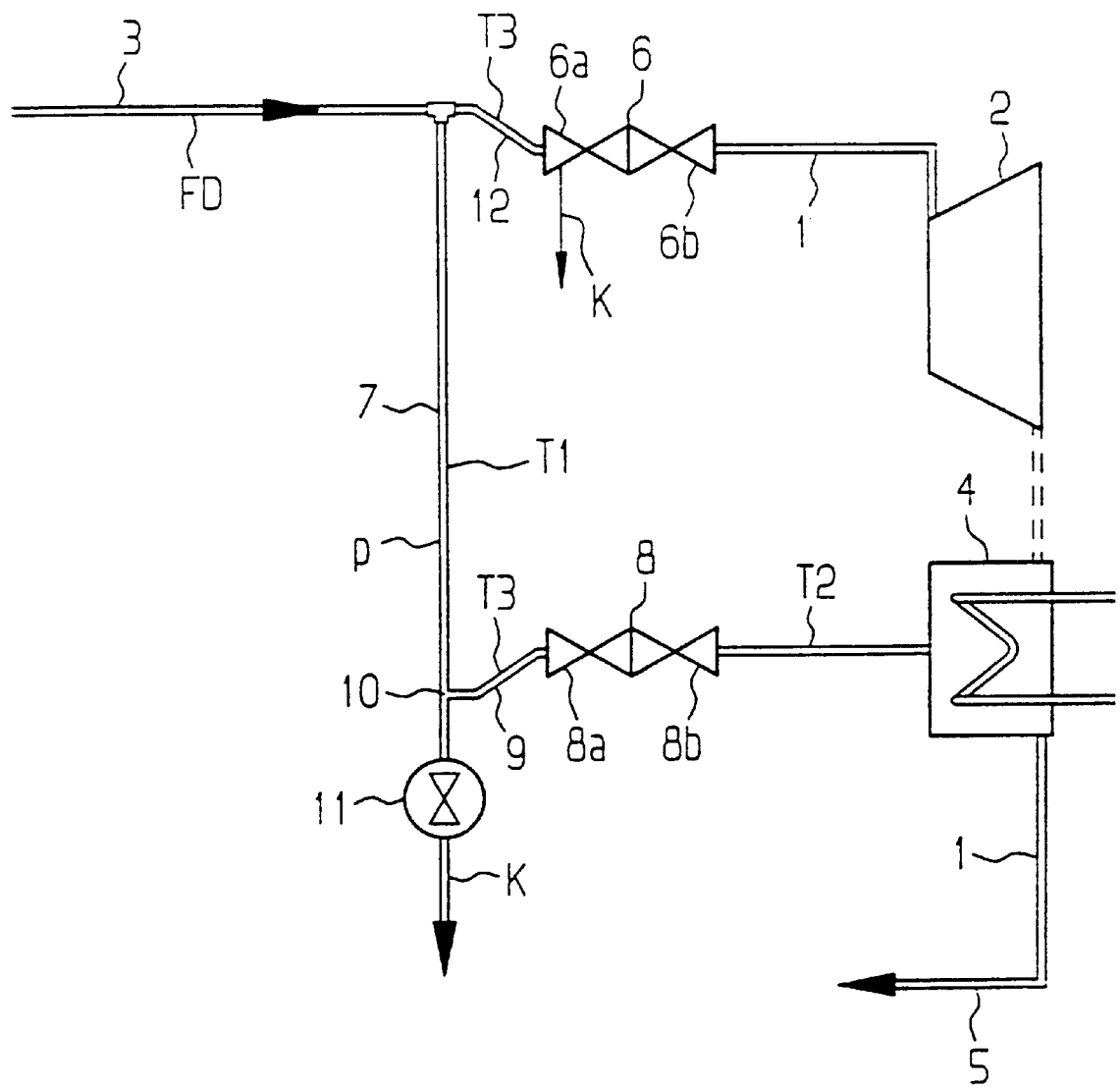
FIG. 1 is a schematic diagram of a part of a water/steam circuit of a steam turbine having an intermediate-pressure valve configuration and a bypass-valve configuration.

Referring now to the figures of the drawings in detail, in which corresponding parts are indicated with corresponding reference numerals, and first, particularly, to FIG. 1 thereof, there is shown a steam turbine 2, connected in a water/steam circuit 1, of a steam-turbine plant having a live-steam line 3 run to the steam turbine 2 and a condenser 4 connected downstream of the steam turbine 2. The condenser 4 is connected on the outlet side via a condensate line 5 to, for example, a steam generator (not shown) for generating live steam FD. The steam turbine 2 may be composed of a high-pressure part, an intermediate-pressure part, and a low-pressure part. In a power station plant, such a steam-turbine plant serves to generate electrical energy, wherein the steam turbine 2 drives a generator (not shown) in a manner which is known per se.

A first valve configuration 6 having a quick-closing valve 6a and a control valve 6b connected to the latter is connected in the live-steam line 3. A bypass 7 is attached to the live-steam line 3 in the direction of flow of the live steam FD upstream of the valve configuration 6. The bypass 7 is run to the condenser 4 via a second valve configuration 8 also having a quick-closing valve 8a and a control valve 8b. The bypass 7 serves to bypass the steam turbine 2 on the steam side, e.g. in the event of a quick shut-off of the quick-acting valve 6a, which is open during a normal operation of the valve configuration 6. In normal operation, the quick-acting valve 8a of the valve configuration 8 is closed. The valve configurations 6 and 8 are a so-called intermediate-pressure valve and a so-called bypass valve, respectively.

During normal operation, the valve configuration 8, which is closed on the quick shut-off side, is kept hot by live steam FD being directed via the bypass 7 to the closed quick-acting valve 8a. The live steam FD, which flows in towards the quick-acting valve 8a at a live-steam temperature of $T1 \leq 700°$ C., accordingly cools down on account of the temperature difference $\Delta T$ developing along the valve configuration 8, since a condensate temperature T2 of about 80° C. prevails on the outflow side of the valve configuration 8 between the control valve 8b and the condenser 4, wherein $\Delta T = T1 - T2$. At a given steam pressure p of typically 20 to 80 bar, the corresponding saturated-steam temperature T3 of 212° C. to 295° C. prevails at the closed quick-acting valve 8a.

This is due to the fact that virtually a blind hole or pocket hole, at which a condenser effect occurs, is formed upstream of the closed quick-acting valve 8a. Due to the steam column which moves up, a flow is produced as a result of a condensation of the live steam FD at the valve configuration 8. In order to continuously discharge the condensate K which is produced in the process, a line section 9 of the bypass 7 is installed with a falling slope on the inflow side upstream of the valve configuration 8. The flow is generated due to a pressure difference, which in turn is generated as a result of the condensation of the live steam FD and the vacuum consequently forming as a result of a reduction in volume of the live steam FD. The continuous discharge of the condensate K is ensured by a draining device 11 attached to the line section 9 at the lowest point 10 of the latter. The draining device 11 may be a valve which opens automatically when the condensate K collects or may be a so-called condensomat which may for instance be embodied as a radial-stage throttle drain valve.

This effect is also utilized to heat up the intermediate-pressure valve configuration 6 during a start-up of the steam turbine 2. While previously a steam flow has been maintained there through the quick-acting valve 6a towards the condenser 4, the heating-up is now effected here too by a condensation of live steam FD in the closed quick-acting valve 6a. To this end, in the exemplary embodiment, a line section 12 is again configured to run sloped on the inflow side of the quick-acting valve 6a of the valve configuration 6. In contrast to the line section 9 provided upstream of the valve configuration 8, the line section 12 is installed with a rising slope, so that the lowest point in this case lies in the quick-acting valve 6a. The condensate K produced by the condensation of the live steam FD due to the temperature difference present during the start-up of the steam turbine 2, upstream and downstream of the valve configuration 6 is discharged from the closed quick-acting valve 6a in a similar manner. Here, too, the saturated-steam temperature T3 corresponding to the respective live-steam pressure p ensues automatically.

FIG. 2 illustrates a longitudinal section of a combined bypass quick-acting and control valve 8, which in the exemplary embodiment is a so-called Z-valve. The quick-acting valve 8a is disposed above the control valve 8b. In contrast to the exemplary embodiment according to FIG. 1, the line section 9, which here forms the inflow section of the valve configuration 8, is not provided with a falling slope but with a rising slope relative to the horizontal H. In this configuration, the angle α of the rising slope is between 0.5° and 5°, preferably 1°. In this case, the lowest point—as viewed in the direction of flow of the live steam FD—lies directly upstream of the valve seat 13 of the closed quick-acting valve 8a. Provided in the valve casing 14 is a draining leadthrough 15, which is led to a place in front of the valve seat 13 and via which the condensate K flows off to a draining device 17. In the event of an operationally induced quick shut-off of the quick-acting valve 6a of the valve configuration 6, the quick-acting valve 8a opens, so that the live steam FD flows off via the latter and via the downstream control valve 8b in the direction of the arrow 16 into the condenser 4.

FIG. 3 shows a typical combined intermediate-pressure quick-acting/control valve 6 having an upright quick-acting valve 6a and a control valve 6b disposed horizontally underneath. In contrast to the exemplary embodiment according to FIG. 1, the line section 12, which here forms the inflow section of the valve configuration 6, is not installed with a rising slope but with a falling slope. The angle β of falling slope between the horizontal H and the descending line section 12 is likewise between 0.5° and 5°, preferably 1°.

At the lowest point 18, a draining device 20 is again attached to the line section 12 via a flange section 19. The live steam FD, which flows in towards a valve seat 21 of the closed quick-acting valve 6a, condenses, in the course of which the condensate K runs off along the line section 12 having a falling slope relative to the horizontal H and runs down to the lowest point 18 on the pipe inner wall 22 of the line section 12. From there, it flows off via the flange section 19 to the draining device 20.

We claim:

1. A method for heating a valve of a valve configuration of a steam turbine, the method which comprises:

directing steam to a valve of a valve configuration through a line section forming an inflow section of the valve configuration and opening into a valve, forming a blind hole or pocket hole while the valve is in a closed state;

condensing the steam in the valve and forming a condensate; and discharging the condensate.

2. The method according to claim 1, which comprises maintaining a heating temperature at a saturated-steam temperature by continuously discharging the condensate.

3. The method according to claim 1, which comprises:

using a bypass-valve configuration as the valve configuration, said bypass-valve configuration being connected to a condenser;

using live steam as the steam; and feeding the live steam via a bypass line to the bypass-valve configuration for keeping the bypass-valve configuration heated.

4. The method according to claim 1, which comprises:

using an intermediate-pressure valve configuration as the valve configuration, said intermediate-pressure valve configuration being connected to a steam turbine;

feeding live steam to the steam turbine; and using the live steam as the steam for heating the intermediate-pressure valve configuration.

5. A valve configuration for a steam turbine, comprising:

a valve being in a closed state; and a steam line having a line section opening into said valve forming a blind hole or pocket hole, said line section being sloped with respect to a horizontal line and directing steam to said valve for heating said valve by condensing the steam and forming a condensate.

6. The valve configuration according to claim 5, including a draining device, said line section extending with a falling slope from said valve and having a lowest point, said draining device connected to said steam line via said lowest point.

7. The valve configuration according to claim 5, including a draining device opening when the condensate is formed, said line section extending with a rising slope from said valve and having a lowest point, said draining device connected to said valve at said lowest point.

8. The valve configuration according to claim 7, wherein said valve has a valve seat and a valve casing formed with a draining leadthrough directly upstream of said valve seat.

* * * * *